United States Patent [19]

Kriegel et al.

[11] Patent Number: 4,522,707
[45] Date of Patent: Jun. 11, 1985

[54] METHOD FOR PROCESSING USED OIL

[75] Inventors: Ernst Kriegel; Hubert Coenen, both of Essen, Fed. Rep. of Germany

[73] Assignee: Fried. Krupp Gesellschaft mit beschränkter Haftung, Essen, Fed. Rep. of Germany

[21] Appl. No.: 572,543

[22] Filed: Jan. 20, 1984

Related U.S. Application Data

[63] Continuation-in-part of Ser. No. 95,100, Nov. 16, 1979, abandoned.

[30] Foreign Application Priority Data

Nov. 22, 1978 [DE] Fed. Rep. of Germany ....... 2850540

[51] Int. Cl.$^3$ .............................................. C10M 11/00
[52] U.S. Cl. .................................... 208/180; 208/184; 208/185
[58] Field of Search ....................... 208/180, 184, 185

[56] References Cited

U.S. PATENT DOCUMENTS

| | | | |
|---|---|---|---|
| 2,391,576 | 12/1945 | Katz et al. | 208/366 |
| 2,391,607 | 12/1945 | Whalley | 208/356 |
| 3,969,196 | 7/1976 | Zosel | 208/337 |
| 4,071,438 | 1/1978 | O'Blasny | 208/180 |
| 4,201,660 | 5/1980 | Zosel | 208/309 |
| 4,233,140 | 11/1980 | Antonelli et al. | 208/180 |
| 4,406,778 | 9/1983 | Borza | 208/185 |

FOREIGN PATENT DOCUMENTS

| | | | |
|---|---|---|---|
| 0055492 | 7/1982 | European Pat. Off. | 208/180 |
| 0019004 | 6/1978 | Japan | 208/180 |
| 2037807 | 7/1980 | United Kingdom | 208/180 |
| 2101154 | 1/1983 | United Kingdom | 208/180 |

*Primary Examiner*—Delbert E. Gantz
*Assistant Examiner*—Helane Myers
*Attorney, Agent, or Firm*—Spencer & Frank

[57] ABSTRACT

A method for processing a used oil which comprises about 70 percent by weight spindle and neutral oils, about 5 percent by weight lower and higher boiling point oils, about 10 percent by weight useful additives and oxidation products, about 10 percent by weight water, about 5 percent by weight difficultly volatile and nonvolatile hydrocarbons, and solid impurities, comprising: (a) dewatering the used oil; (b) contacting the dewatered used oil with a gas in a supercritical state, at a temperature above the critical temperature and at a pressure from its critical pressure up to about 350 bar to form (1) a gaseous extraction phase containing the spindle and neutral oils and the additives, the spindle and neutral oils and substantially all the additives being extracted into the gaseous extraction phase during the contact with the supercritical gas and (2) an extraction residue; (c) separating the gaseous extraction phase from the extraction residue; and (d) separating the extracted spindle and neutral oils and the extracted additives from the gaseous extraction phase obtained in step (c) by changing the thermodynamic state of the gaseous extraction phase.

10 Claims, No Drawings

METHOD FOR PROCESSING USED OIL

CROSS REFERENCE TO RELATED APPLICATION

This application is a continuation-in-part application of applicants' co-pending U.S. patent application Ser. No. 95,100, which was filed on Nov. 16, 1979 now abandoned.

BACKGROUND OF THE INVENTION

The present invention relates to a method for processing used oil comprising approximately 70 percent by weight spindle and neutral oils, 5 percent by weight lower and higher boiling point oils, 10 percent by weight additives and oxidation products, 10 percent by weight water as well as 5 percent by weight difficultly volatile or nonvolatile hydrocarbons and varying contents of solids. The solids contained in the used oil, are, for example, sand, dust and metal particles. The secondary raffinate obtained from processing of used oil is used particularly as lubricating oil.

In a known method for processing used oil, an aqueous phase and the solids are initially separated from the used oil by sedimentation in storage vessels. Then, solvents, emulsified water and light oils are distilled from the oil-containing phase. The distillation residue, which is called dry oil, is then mixed, for purposes of raffination, with 12 percent by weight concentrated sulfuric acid. The resulting material is the so-called acid resin which is separated in the form of a sludge from the raffinate, which is called the acid oil. After the addition of 5 percent by weight bleaching earth to the acid oil, a vacuum distillation is performed providing heavy oil and spindle oil. A basic oil is produced from part of the spindle oil and the heavy oil, to which suitable additives are added in order to permit processing into machine and engine oil. After neutralization, the raffination residue (that is, the acid resin and the residue from the distillation of the acid oil) is burnt or stored in a suitable depository.

According to another prior art method, dry oil is mixed with lime, decomposing a great many components foreign to oil but also desirable additives. The decomposition products are bound, polymerized or coagulated. By subsequent vacuum distillation, raffinates of a high degree of purity are obtained which must be further purified by subsequent raffination with sulfuric acid, bleaching earth or extraction with a solvent.

In still another prior art method, extraction of dry oil with liquid propane has also been proposed. The liquid propane charged with oil is extracted at the head of an extraction column while the insoluble residue flows from the bottom of the column. After recovery of the propane still contained therein, the residue is burnt together with heating oil. The propane is separated from the oil-containing extract by means of a two-stage evaporation process and, after liquefaction, is returned to the extraction column. The extracted oil, free of propane, is subjected to sulfuric acid raffination.

The drawback of sulfuric acid raffination is, in particular, that a large quantity of sulfuric acid (12 percent by weight of the dry oil) is required and that considerable quantities of waste sulfuric acid, acid resin or acid ether (about 36 percent by weight of the dry oil), as well as sulfur dioxide, are obtained. The disposal of the acid resin proves to be particularly difficult since it must be neutralized before it can be stored in a depository and since its combustion produces large quantities of sulfur dioxide. The use of lime or propane for processing used oil also results in the formation of waste products which are difficult to dispose of.

The critical temperature of a gas is well known to physical chemists as the temperature above which the gas cannot be liquified regardless of the pressure to which it is subjected. The pressure necessary to liquify the gas at its critical temperature is the critical pressure.

It is known that gases in the supercritical state have the capacity to absorb certain compounds depending on their precise thermodynamic state. A change in thermodynamic state can result in the release of the absorbed substances.

German Auslegeschrift No. 1,493,190 discloses a method for processing mixtures which are liquid and/or solid under process conditions, and which contain organic compounds and/or organic groups. The mixture of substances is treated with a gas under supercritical conditions of temperature and pressure, at a temperature up to 100° C. beyond the critical temperature of the gas. After separation of the supercritical gas phase, the compounds contained therein are recovered by relaxation and/or increased temperature. Spent machine oil was treated with ethylene gas according to this method, and it was reported that 90 percent of the oil could be separated. However, no information is given about the composition of the extracted product, and it would not be expected that the additives contained in the used oil would also be extracted, and that both the extracted oils and the extracted additives could be reused.

SUMMARY OF THE INVENTION

It is an object of the present invention to provide a method for processing used oil in which the substances used for the processing can be recovered and reused.

It is also an object of the present invention to provide a method for processing used oil which operates at comparatively low temperatures.

It is also an object of the present invention to provide a method for processing used oil which furnishes only small quantities of waste products and whose waste products can be easily disposed of.

It is a further object of the present invention to provide a method for processing used oil in which almost all useful compounds contained in the oil can be recovered.

To achieve the foregoing objects, and in accordance with its purpose, the present invention provides a method for processing a used oil which comprises about 70 percent by weight spindle and neutral oils, about 5 percent by weight lower and higher boiling point oils, about 10 percent by weight additives and oxidation products, about 10 percent by weight water, about 5 percent by weight difficultly volatile or nonvolatile hydrocarbons, and solid impurities, comprising: (a) dewatering the used oil; (b) contacting the dewatered used oil with a gas in a supercritical state at a temperature above its critical temperature and at a pressure from its critical pressure to about 350 bar to form (1) a gaseous extraction phase containing the spindle and neutral oils and the additives, the spindle and neutral oils and the additives being extracted into the gaseous extraction phase during the contact with the supercritical gas, and (2) an extraction residue; (c) separating the gaseous extraction phase from the extraction residue; and (d) separating the extracted spindle and neutral oils and the extracted additives from the gaseous extraction phase obtained in step (c) by changing the thermodynamic state of the gaseous extraction phase.

The change in the thermodynamic state of the gaseous extraction phase can be effected by (1) reducing the temperature or the pressure, or both temperature and pressure of the gaseous extraction phase, or (2) by reducing the pressure and increasing the temperature of the gaseous extraction phase.

The process of the present invention extracts the additives in the used oil and the usable oils of the used oil to form a processed oil which can be reused.

It is to be understood that both the foregoing general description and the following detailed description are exemplary, but are not restrictive of the invention.

DETAILED DESCRIPTION OF THE INVENTION

The process of the present invention, broadly stated, comprises contacting a used oil with a gas under super-critical conditions to form a gaseous phase containing useful oils and additives and an extraction residue, separating the gaseous extraction phase from the extraction residue, and separating the useful oils and additives from the separated gaseous extraction phase by changing the thermodynamic state of the separated gaseous extraction phase. The thermodynamic state may be changed either by reducing the temperature and/or pressure of the gaseous extraction phase or by reducing the pressure and increasing the temperature of the gaseous extraction phase.

The used oils suitable for use in the present process are those which have an average composition of about 70 percent by weight spindle and neutral oils, about 5 percent by weight lower and higher boiling point oils, about 10 percent by weight additives and oxidation products, about 10 percent by weight water and about 5 percent by weight difficultly volatile or nonvolatile hydrocarbons. Solid impurities, such as sand, dust and metal particles, may also be present in varying quantities. The spindle and neutral oils are lubricating oils at low and low to medium viscosities, respectively.

In practicing the process of the present invention, the used oil to be processed can be collected where it is created and transferred to a processing plant. The used oil initially is dewatered, typically by a known process of distillation, which also separates most of the low boiling point oils. The dewatered oil is then transferred to an autoclave, where it is mixed with a gas which is under supercritical conditions of temperature and pressure. In the present invention, "super-critical" conditions refers to a temperature above the critical temperature and a pressure at or above the critical pressure. A maximum pressure of about 350 bar may be used in this step.

As used in the present invention, the term "gas" refers to a single inert gas and also to mixtures of two or more inert gases.

Several guides should be used in the selection of an appropriate gas. The gas should not be reactive with any of the materials to be separated, that is, it should be inert. The gas should not impart undesirable qualities to the oil, such as undesirable odor. The critical temperature of the gas should not be so high that heating the oil extracted to above the critical temperature will cause undesirable effects, such as decomposition. The critical temperature must also not be so low that cooling to subcritical condition is difficult for standard industrial equipment. For these reasons, the critical temperature of the gas chosen will generally be between about 10° C. and 300° C. Some typical gases suitable for extractions, along with their critical temperatures and pressures are:

| Gas | T °C. | P (atm) |
| --- | --- | --- |
| Carbon dioxide | 31 | 73.9 |
| Ethane | 32.2 | 48.2 |
| Propane | 96.7 | 42 |
| $CHF_3$ | 25.9 | 46.9 |
| $N_2O$ | 36.5 | 71.7 |
| $CClF_3$ | 28.9 | 38.2 |
| $C_2H_2F_2$ | 30.1 | 43.8 |
| $CHClF_2$ | 96 | 48.5 |
| Ethene | 9.9 | 51.2 |
| Propene | 91.9 | 45.4 |
| $C_6H_{14}$ | 234.2 | 30.3 |
| $C_2H_5OH$ | 243.2 | 63.8 |
| $C_6H_6$ | 289.0 | 49.2 |

The preferred gases for use in the present invention are carbon dioxide, or propane, or ethene as the single inert gas, and a mixture of ethane and ethene, or a mixture of propane and propene as the gas mixture. These gases have been found to be of particular advantage as extraction agents in the used oil processing method of the present invention. The composition of mixtures of two or more gases can be of various proportions.

Further, it has also been found advantageous to add an entrainer to the gas, in order to improve the absorbability and selectivity of the gaseous extraction agent with respect to certain compounds. Examples of suitable entrainers are water, alcohols or aromatic compounds.

While flowing through the used oil, the gas, depending on its thermodynamic state, charges itself with a large part of the spindle and neutral oils as well as with the additives. The oxidation products, the difficultly volatile or nonvolatile hydrocarbons and the solids remain almost quantitatively in the autoclave as extraction residue. The charged gas phase, which contains the neutral and spindle oils which are here called the secondary raffinate, is extracted at the top of the autoclave and is then relaxed by means of a choke valve. The pressure, temperature, or both, may be reduced at this point, or the pressure may be reduced while the temperature is increased. The gas, corresponding to its new thermodynamic state, partially or completely loses its absorbability for the dissolved organic substances. The extracted substances are consequently separated in whole or in part, and can be removed at the bottom of a separator. The relaxed, gaseous extraction agent leaves the separator and, after condensation, can be fed to a turnover pump with a subsequently connected heat exchanger to again produce a supercritical gas which can be reused to treat more used oil in the extraction process.

The extraction residue is removed from the autoclave and relaxed in a separator. The gas recovered from the relaxation of the extraction residue can also be reused in the extraction process.

Particularly in continuous processes, it has been found to be advantageous to separate the secondary raffinate comprised of the extracted spindle and neutral oils and the extracted additives from the gaseous extraction agent in several fractions, by successive changes in thermodynamic state.

By using the gaseous extraction agents in supercritical state according to the present invention, there occurs a substantially quantitative separation of the substances foreign to the oil. The substances foreign to the oil remain in the extraction residue and they can be disposed of simply, for example, as material for road making or can be deposited. Moreover, it is an advantage of the present invention that the extraction agent can be reused and that the process according to the present invention can be performed continuously. Further, the process can be adapted to the conditions at hand in that it is possible to conduct the extraction agent and the used oil in the same direction, in countercurrent or in a superposed crosscurrent, whereby some of the secondary raffinate separated from the extraction agent can be returned into circulation. The process according to the present invention employs lower temperatures than prior art distillation processes, so that cracking and polymerization reactions of the compounds contained in the oil are essentially avoided in the practice of the present invention. Dewatering of the used oil can be effected in practicing the present invention in a known manner by distillation in which part of the lower boiling point oils are also separated.

The following examples illustrate the process of the present invention.

EXAMPLE 1

A mass stream of 1.044 kg/h dewatered used oil was treated with a mass stream of 6.78 kg/h propane at a pressure of 76 bar and at a temperature of 130° C. 80 percent of the used oil was extracted. The extracted oil which contained the extracted additives, was separated from the propane at a pressure of 10 bar and a temperature of 66.7° C. Propane has a critical temperature $T_K$ of 96.7° C. and a critical pressure $p_K$ of 42.6 bar.

EXAMPLE 2

A mass stream of 0.828 kg/h dewatered used oil was treated with a mass stream of 12.799 kg/h carbon dioxide at a pressure of 320 bar and a temperature of 90° C. 52.8 percent of the used oil was obtained as secondary raffinate, which contained the additives that were present in the used oil. The secondary raffinate was separated from the extraction agent under a pressure of 56 bar and at a temperature of 70° C. Carbon dioxide has a critical temperature of $T_K$ of 31° C. and a critical pressure $p_K$ of 73.9 bar.

EXAMPLE 3

A mass stream of 0.744 kg/h dewatered used oil was extracted with a mass stream of 4.046 kg/h ethene at a temperature of 60° C. and a pressure of 250 bar, and 61.7 percent of the used oil could be recovered as secondary raffinate. The secondary raffinate contained the additives which were present in the used oil. The extracted substances were separated from the ethene at a temperature of 64.5° C. at a pressure of 48 bar. Ethene has a critical temperature $T_K$ of 9.9° C. and a critical pressure $p_K$ of 51.2 bar.

EXAMPLE 4

From a water containing used oil contaminated with solids, dewatering and sedimentation resulted in a substantially solids free and dewatered dry oil. The dry oil was extracted with ethane at 150 bar and 55° C. Under different conditions, three oil fractions were separated from the supercritical gas phase, while the contaminants remained in the extraction residue. The following products were obtained from 100 g dry oil:

extraction residue: 19.6 g,
oil fraction I: 37.9 g,
oil fraction II: 27.4 g,
oil fraction III: 15.1 g.

The oil fractions were separated from the supercritical gas phase under the following conditions:
oil fraction I: 140 bar, 106° C.,
oil fraction II: 110 bar, 110° C.,
oil fraction III: 36 bar, 62° C.

The dry oil was black and cloudy. The extraction residue was black, tar-like and highly viscous. Oil fraction I was yellow, transparent and had a viscosity of 4.71° Engler. Oil fraction II was light yellow, transparent and had a viscosity of 2.22° Engler. Oil fraction III was light yellow, transparent and had a viscosity of 1.20° Engler. Oil fractions I and II contain the spindle and neutral oils and can be used as lubricants while oil fraction III is suitable for mixing or diluting with lubricants.

The 100 g dry oil contained 10.4 g additive and oxidation products. Due to its polar properties, this 10.4 g fraction could be separated from the nonpolar hydrocarbons by column chromatographic methods. This separation also brought about a separation of the reusable additives and the nonreusable oxidation products. The tar-like oxidation products could no longer be eluted from the chromatography column. The separation of the polar fraction of the dry oil indicated that 100 g dry oil contained 5.1 g oxidation products and spent additives, respectively, and 5.3 g reusable additives. Of these 5.3 g reusable additives, the following additive quantities were found in the individual oil fractions:

oil fraction I: 2.77 g; 7.3 weight %,
oil fraction II: 2.33 g; 8.5 weight %,
oil fraction III: no additives found.

The additive yield of the supercritical gas phase extraction process of the present invention thus was 5.1 g, corresponding to 96%. In the extraction, 80.4 g reusable oils were recovered from 100 g dry oil, corresponding to a yield of 80.4%. Thus, these tests showed that the process according to the present invention is able to almost quantitatively recover not only the reusable hydrocarbons (reusable fractions) but also the reusable additives. The yield of reusable oils can be improved further if the process according to the present invention is used in a large industrial application because such a large-scale system can be designed so that it operates with the optimum separating precision.

It is noted that because of the complicated analysis methods, it is estimated that the error in the above additive determinations is ±10%.

From oil fraction I, the additives contained therein, i.e. 2.77 g, were separated by column chromatographic methods. Then the additives were separated by gas chromatographic methods into five major groups which were examined in greater detail by means of infrared spectroscopic and mass spectroscopic methods. It was then found that the additives contained in oil fraction I comprised the following compounds:

71.8 weight % dioctyl phthalate,
2.7 weight % stearine acid methyl ester,
3.3 weight % phthalic acid ester of higher alcohols having an average molecular weight of 560,
1.8 weight % acetic acid decyl ester, and 20.4 weight % different additives whose respective concentration was below 1% and which therefore were not characterized further.

It is known that the above-identified compounds are used as additives. Therefore, the process according to the present invention makes it possible to recover valuable additives from used oil.

With the gaseous supercritical extraction process of the present invention, it is possible to almost quantitatively recover from the used oil, not only the reusable oil fraction (hydrocarbons), but also the reusable useful additives. The residue which remains contains the impurities almost quantitatively. The term "useful additive" as used herein is well known to mean useful substances intentionally added to mineral oils (lubricating oils, hydraulic oils, drilling oils, etc.) to improve their properties.

It will be understood that the above description of the present invention is susceptible to various modifications, changes and adaptations, and the same are intended to be comprehended within the meaning and range of equivalents of the appended claims.

What is claimed is:

1. A method for processing a used oil which comprises about 70 percent by weight spindle and neutral oils, about 5 percent by weight lower and higher boiling point oils, about 10 percent by weight useful additives and oxidation products, about 10 percent by weight water, about 5 percent by weight difficultly volatile and nonvolatile hydrocarbons, and solid impurities, wherein substantially all oils and useful additives are recovered in almost quantitative amounts without cracking or polymerization, comprising:
   (a) dewatering the used oil;
   (b) contacting the dewatered used oil with gas in a supercritical state said gas having a critical temperature between about 10° C. and 300° C., at a temperature above the critical temperature and at a pressure from its critical pressure up to about 350 bar, to form (1) a gaseous extraction phase containing the spindle and neutral oils and the additives, the spindle and neutral oils and substantially all the useful additives being extracted into the gaseous extraction phase during the contact with the supercritical gas and (2) an extraction residue;
   (c) separating the gaseous extraction phase from the extraction residue; and
   (d) separating the extracted spindle and neutral oils and the extracted additives from the gaseous extraction phase obtained in step (c) by changing the thermodynamic state of the gaseous extraction phase.

2. A method as defined in claim 1, wherein said gas is carbon dioxide, propane, ethene, a mixture of ethane and ethene, or a mixture of propane and propene.

3. A method as defined in claim 1, wherein an entrainer is added to said gas.

4. A method as defined in claim 1, wherein the extracted spindle and neutral oils and the extracted additives are separated from the gaseous extraction phase in several fractions.

5. A method as in claim 1, wherein the thermodynamic state is changed by reducing at least one of the temperature or pressure of the gaseous extraction phase.

6. A method as in claim 1, wherein the thermodynamic state is changed by reducing the pressure and temperature of the gaseous extraction phase.

7. A method as in claim 1, wherein the thermodynamic state is changed by reducing the temperature of the gaseous extraction phase.

8. A method as in claim 1, wherein the thermodynamic state is changed by reducing the pressure and increasing the temperature of the gaseous extraction phase.

9. A method as defined in claim 1, wherein said gas is ethane.

10. A method as defined in claim 1, wherein at least 95% of the useful additives are recovered.

* * * * *